US008787972B2

(12) United States Patent
Lee

(10) Patent No.: US 8,787,972 B2
(45) Date of Patent: Jul. 22, 2014

(54) ELECTRONIC DEVICE AND METHOD FOR MANAGING COMMANDS

(71) Applicant: Chi Mei Communication Systems, Inc., New Taipei (TW)

(72) Inventor: Pao-I Lee, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/749,590

(22) Filed: Jan. 24, 2013

(65) Prior Publication Data

US 2013/0252644 A1    Sep. 26, 2013

(30) Foreign Application Priority Data

Mar. 26, 2012    (TW) .............................. 101110457 A

(51) Int. Cl.
    *H04B 1/38*    (2006.01)
(52) U.S. Cl.
    USPC ......... 455/557; 455/466; 455/450; 455/552.1
(58) Field of Classification Search
    USPC ................................ 455/557, 466, 450, 552.1
    See application file for complete search history.

(56) References Cited

U.S. PATENT DOCUMENTS

| 7,437,163 | B2 * | 10/2008 | Palacio et al. ................. 455/445 |
| 7,522,519 | B2 * | 4/2009 | Messenger et al. ........... 370/230 |
| 7,899,078 | B1 * | 3/2011 | Lai et al. ....................... 370/469 |
| 8,417,254 | B2 * | 4/2013 | Shu et al. ...................... 455/450 |
| 2011/0269456 | A1 * | 11/2011 | Krishnaswamy et al. . 455/426.1 |

* cited by examiner

*Primary Examiner* — Barry Taylor
(74) *Attorney, Agent, or Firm* — Novak Druce Connolly Bove + Quigg LLP

(57) ABSTRACT

In a method for managing commands of an electronic device, a command queue is generated at a radio interface layer (RIL) of the electronic device. The method sets a buffer storage to store an identifier and command contents of each command. A received command from a telephony framework layer is stored in the command queue when the electronic device is establishing a communication link. An identifier of each command in the command queue is determined when the command queue has a command. Command contents corresponding to the determined identifier is determined when the buffer storage stores the determined identifier. The method creates first response information according to the determined command contents, and sends the first response information to the telephony framework layer.

18 Claims, 4 Drawing Sheets

ELECTRONIC DEVICE AND METHOD FOR MANAGING COMMANDS

BACKGROUND

1. Technical Field

Embodiments of the present disclosure relate to data management technology, and particularly to an electronic device and method for managing commands using the electronic device.

2. Description of Related Art

When an electronic device, such as a communication device, is establishing a communication link, the electronic device has to wait for a response from a network. During the time the electronic device waits for the response from the network, commands sent from the telephony framework layer of the electronic device are buffered in the radio interface layer (RIL) or the attention (AT) command channel of the electronic device.

Generally, some of the commands buffered in the RIL are duplicate commands that are sent by the telephony framework layer repeatedly. Thus, system resources of the electronic device are wasted for processing the repeated commands.

If the commands are buffered in the AT command channel, many commands newly received from the telephony framework layer may be inserted into the AT command channel, thus, the AT command channel will have a full buffer. Therefore, an efficient method for managing commands using an electronic device is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
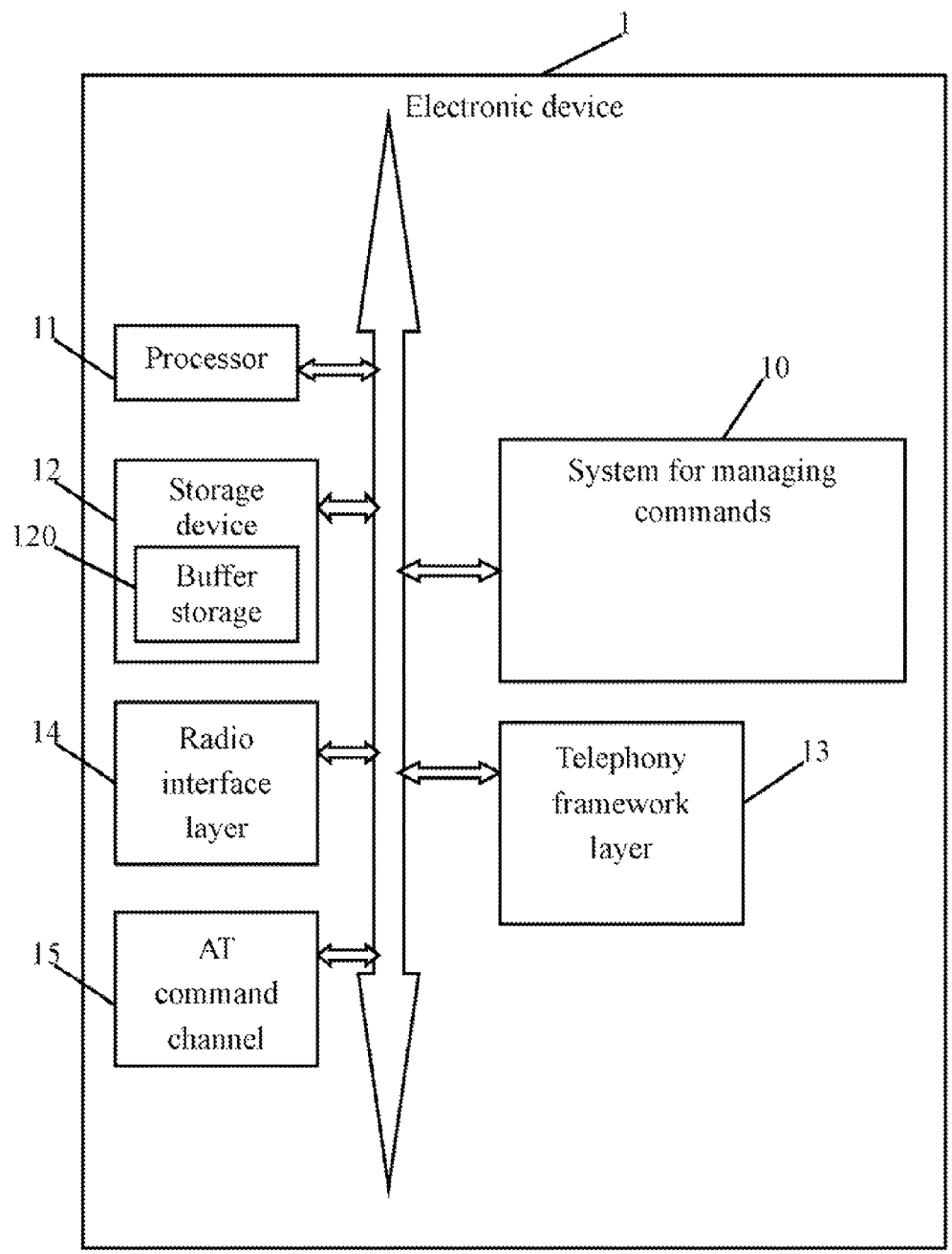
FIG. 1 is a schematic diagram of one embodiment of an electronic device including a system for managing commands.

FIG. 1 is a block diagram of one embodiment of an electronic device 1. The electronic device 1 includes a system 10 for managing commands (hereinafter referred to as "the system 10"), at least one processor 11, a storage device 12, a telephony framework layer 13, a radio interface layer (RIL) 14, and an attention (AT) command channel 15. FIG. 1 illustrates only one example of the electronic device 1 that may include more or fewer components than illustrated, or a different configuration of the various components in other embodiments.

The system 10 is used to allocate commands received by the telephony framework layer 13, and reduce a number of commands that need to be sent to the AT command channel 15, thereby reducing the commands buffered in the RIL 14 or the AT command channel 15. A detailed description of the system 10 will be given in the following paragraphs.

In one embodiment, the electronic device 1 may be a mobile phone, a tablet computer, a personal digital assistant, a notebook computer, or any other device. The telephony framework layer 13, the RIL 14, and the AT command channel 15 are in communication with each other to transmit relevant data (e.g., different kinds of commands) and execute the commands.

In one embodiment, the system 10 may include computerized instructions in the form of one or more programs that are executed by the at least one processor 11 and stored in the storage device 12. The storage device 12 stores one or more programs, such as programs of the operating system, other applications of the electronic device 1, and various kinds of data, such as command parameters. In some embodiments, the storage device 12 may be a memory of the electronic device 1 and/or an external storage card, such as a memory stick, a smart media card, a compact flash card, a secure digital card, or any other type of memory storage device. In some embodiments, the storage device 12 includes a buffer storage 120. A detail description will be provided below.

Figure 2:
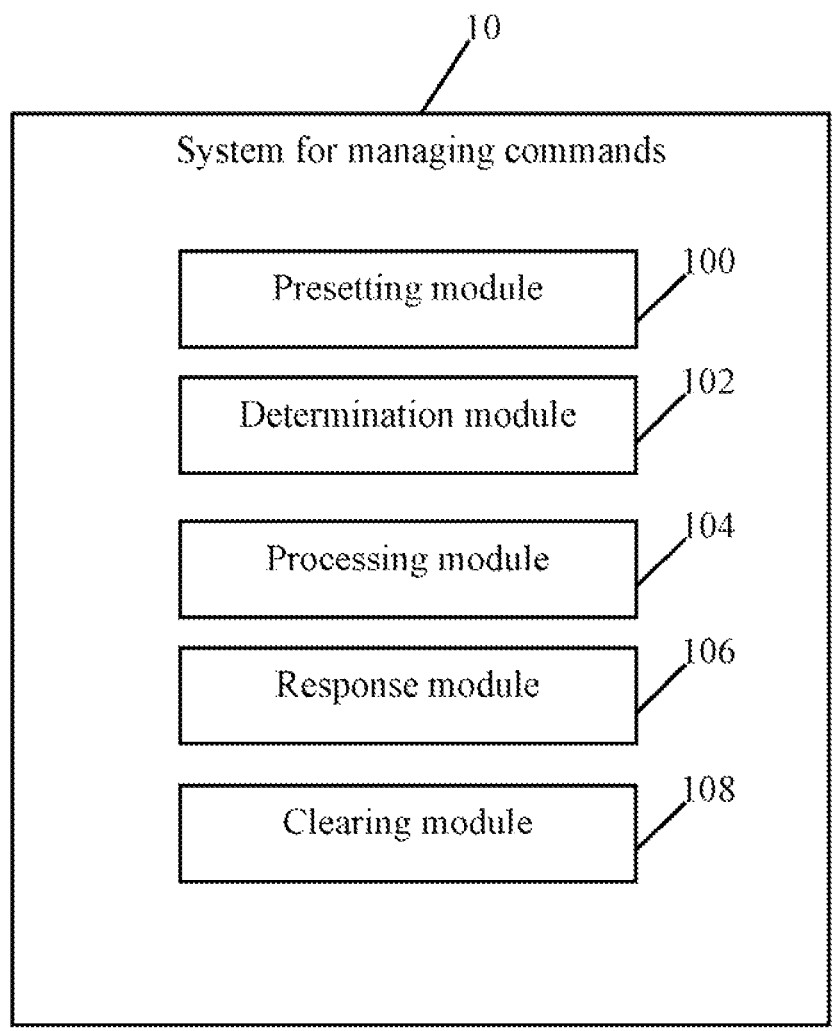
FIG. 2 is a schematic diagram of function modules of the system for managing commands in the electronic device.

FIG. 2 is a block diagram of function modules of the system 10 included in the electronic device 1. In one embodiment, the system 10 may include one or more modules, for example, a presetting module 100, a determination module 102, a processing module 104, a response module 106, and a clearing module 108. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
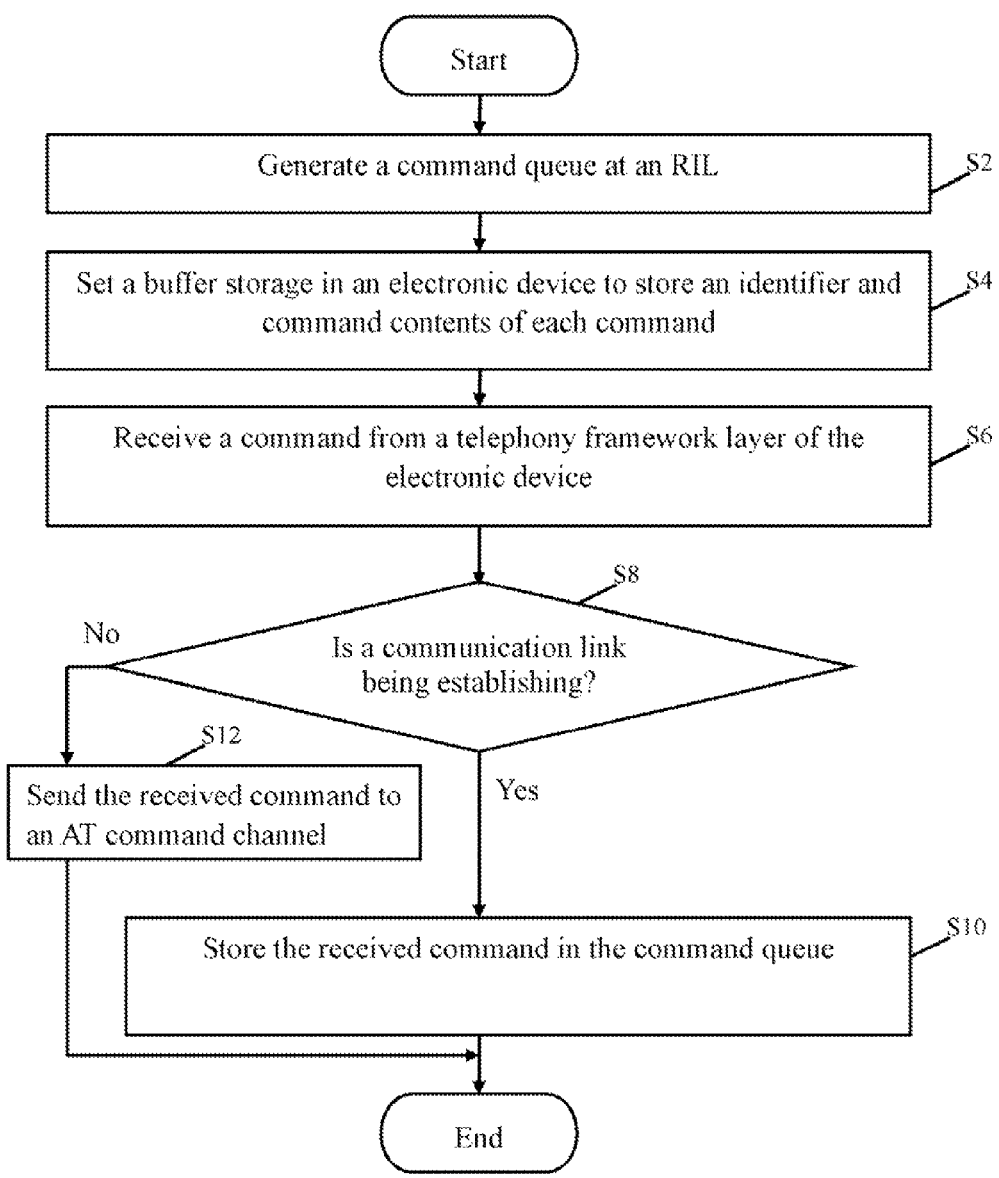
FIG. 3 is a flowchart of one embodiment of a method for allocating commands using the system for managing commands.

FIG. 3 is a flowchart of one embodiment of a method for allocating commands using the system 10. Depending on the embodiment, additional steps may be added, others removed, and the ordering of the steps may be changed.

In step S2, the presetting module 100 generates a command queue at the RIL 14.

In step S4, the presetting module 100 sets a buffer storage 120 in the storage device 12 of the electronic device 1, to store an identifier and command contents of each command. The identifier of each command may be represented using different kinds of characters, such as, numbers, alphabet, symbols, for example.

In step S6, the determination module 102 receives a command from the telephony framework layer 13.

In step S8, the determination module 102 determines whether the electronic device 1 is establishing a communication link according to the received command. In some embodiments, one or more specified commands may be used to establish the communication link, thus, the determination module 102 may determine whether the received command from the telephony framework layer 13 is one of the specified commands. When the received command is one of the specified commands, the determination module 102 determines that the electronic device 1 is establishing the communication link.

For example, a command of "Setup_Data_Call_Req" may be used to established the communication link between the electronic device 1 and a network (e.g., the Internet or an intranet) or other electronic devices. In some embodiments, the communication link follows a Packet Data Protocol (PDP).

If the electronic device 1 is establishing the communication link, in step S10, the processing module 104 stores the received command sent by the telephony framework layer 13 in the command queue. For example, the received command is buffered in the command queue to wait for process.

If the electronic device 1 is not establishing the communication link, in step S12, the processing module 104 sends the received command to the AT command channel 15.

By utilizing the above method shown in FIG. 3, the processing module 104 may allocate the received command according to different conditions of the electronic device 1.

Figure 4:
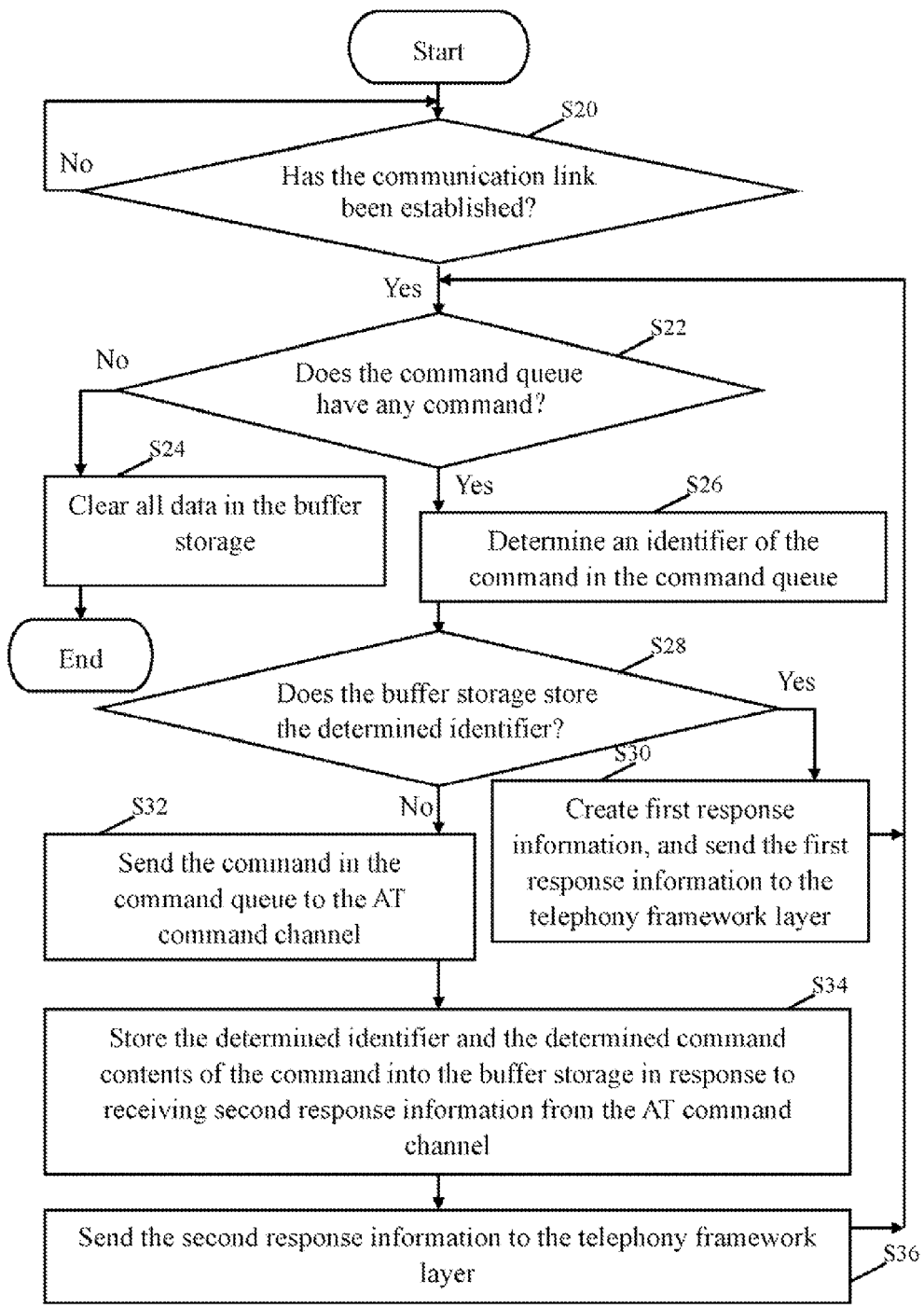
FIG. 4 is a flowchart of a method for managing commands using the electronic device.

FIG. 4 is a flowchart of one embodiment of a method for managing commands using the system 10 in the electronic device 1. Depending on the embodiment, additional steps may be added, others removed, and the ordering of the steps may be changed.

In step S20, the determination module 104 determines whether the communication link has been established. If the communication link has not been established, step S20 is repeated until the communication link is determined to be established.

If the communication link has been established, in step S22, the determination module 104 determines whether the command queue has any command.

If the command queue has no command, in step S24, the clearing module 109 clears all data stored in the buffer storage 120.

If the command queue has at least one command, in step S26, the determination module 104 determines an identifier of each of the at least one command in the command queue.

For simplification, it is assumed that the command queue has one command in the following descriptions. When the command queue has a plurality of commands, the following steps may be repeated for a plurality of times until each of the commands in the command queue has been determined and processed. For example, the determination module 104 may select one of the commands in the command queue one by one according to a predetermined sequence.

In step S28, the determination module 104 determines whether the buffer storage 120 stores the determined identifier of the command in the command queue.

If the buffer storage 120 stores the determined identifier of the command in the command queue, in step S30, the response module 106 determines command contents in the buffer storage 120 corresponding to the determined identifier, creates first response information according to the determined command contents, and sends the first response information to the telephony framework layer 13, then the procedure returns to step S22.

In some embodiments, after the response module 106 sends the first response information to the telephony framework layer 13, the response module 106 deletes the command from the command queue. As mentioned above, when the command queue has more than one command, a next command in the command queue is selected by the determination module 102.

If the buffer storage 120 does not store the determined identifier of the command in the command queue, in step S32, the response module 106 sends the command in the command queue to the AT command channel 15 of the electronic device 1.

In response to receiving second response information from the AT command channel, in step S34, the response module 106 stores the determined identifier and the determined command contents of the command in the command queue into the buffer storage 120.

In step S36, the response module 106 sends the second response information to the telephony framework layer 13, and deletes the command from the command queue, and then the procedure returns to step S22.

For example, it is assumed that the command queue has a command "A", an identifier of the command "A" is "01," when the buffer storage 120 does not store the identifier "01," it is determined that no command "A" has been sent to the AT command channel 15. Thus, the response module 106 sends the command "A" to the AT command channel 15. When the buffer storage 120 stores the identifier "01," it is determined that there is at least one command "A" has been sent to the AT command channel 15. Thus, the response module 106 creates first response information including command contents of the command "A," and sends the first response information to the telephony framework layer 13. Accordingly, the response module 106 does not send a same command (e.g., the command "A") to the AT command channel 15 repeatedly.

By using the identifiers stored in the buffer storage 120, the commands in the command queue can be identified using the determination module 102 to avoid sending the same commands to the AT command channel 15 repeatedly, thereby reducing the commands buffered in the RIL 14 or the AT command channel 15.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:
1. A computer-implemented method for managing commands of an electronic device, the electronic device comprising a telephony framework layer, a radio interface layer (RIL), and an AT command channel, the method comprising:
generating a command queue at the RIL;
setting a buffer storage in the electronic device to store an identifier and command contents of each command;
storing a received command sent by the telephony framework layer in the command queue when the electronic device is establishing a communication link;
determining whether the command queue has any command after the communication link has been established;
determining an identifier of each of the at least one command in the command queue when the command queue has at least one command;
determining command contents corresponding to the determined identifier, when the buffer storage stores the determined identifier; and
creating first response information according to the determined command contents, and sending the first response information to the telephony framework layer.

2. The method according to claim 1, further comprising:
sending the at least one command in the command queue to the AT command channel of the electronic device when the buffer storage does not store the determined identifier;
storing the determined identifier and the determined command contents of each of the at least one command into the buffer storage, in response to receiving second response information from the AT command channel; and
sending the second response information to the telephony framework layer.

3. The method according to claim 1, further comprising:
sending the received command sent by the telephony framework layer to the AT command channel when the electronic device is not establishing the communication link.

4. The method according to claim 1, further comprising:
clearing all data in the buffer storage when the command queue has no command.

5. The method according to claim 1, wherein the communication link follows a Packet Data Protocol (PDP).

6. The method according to claim 1, further comprising:
presetting one or more specified commands to establish the communication link of the electronic device;
determining whether one of the one or more specified commands is received from the telephony framework layer; and
determining that the electronic device is establishing the communication link, when one of the one or more specified commands is received from the telephony framework layer.

7. An electronic device, comprising:
a telephony framework layer, a radio interface layer (RIL), and an attention (AT) command channel;
a storage device;
at least one processor; and
one or more modules that are stored in the storage device and are executed by the at least one processor, the one or more modules comprising:
a presetting module that generates a command queue at the RIL, and sets a buffer storage in the electronic device to store an identifier and command contents of each command;
a processing module that stores a received command sent by the telephony framework layer in the command queue when the electronic device is establishing a communication link;
a determination module that determines whether the command queue has any command after the communication link has been established, and determines an identifier of each of the at least one command in the command queue when the command queue has at least one command; and
a response module that determines command contents corresponding to the determined identifier, when the buffer storage stores the determined identifier, creates first response information according to the determined command contents, and sends the first response information to the telephony framework layer.

8. The electronic device according to claim 7, wherein the response module sends the at least one command in the command queue to the AT command channel of the electronic device when the buffer storage does not store the determined identifier, stores the determined identifier and the determined command contents of each of the at least one command into the buffer storage in response to receiving second response information from the AT command channel, and sends the second response information to the telephony framework layer.

9. The electronic device according to claim 7, wherein the processing module sends the received command sent by the telephony framework layer to the AT command channel when the electronic device is not establishing the communication link.

10. The electronic device according to claim 7, wherein the one or more modules further comprises a clearing module that clears all data in the buffer storage when the command queue has no command.

11. The electronic device according to claim 7, wherein the communication link follows a Packet Data Protocol (PDP).

12. The electronic device according to claim 7, wherein the presetting module further presets one or more specified commands to establish the communication link of the electronic device, and the determination module further determines whether one of the one or more specified commands is received from the telephony framework layer, and determines that the electronic device is establishing the communication link when one of the one or more specified commands is received from the telephony framework layer.

13. A non-transitory storage medium having stored thereon instructions that, when executed by a processor of an electronic device, causes the electronic device to perform a method for managing commands of an electronic device, the electronic device comprising a telephony framework layer, a radio interface layer (RIL), and an AT command channel, the method comprising:
generating a command queue at the RIL;
setting a buffer storage in the electronic device to store an identifier and command contents of each command;
storing a received command sent by the telephony framework layer in the command queue when the electronic device is establishing a communication link;
determining whether the command queue has any command after the communication link has been established;
determining an identifier of each of the at least one command in the command queue when the command queue has at least one command;
determining command contents corresponding to the determined identifier, when the buffer storage stores the determined identifier; and
creating first response information according to the determined command contents, and sending the first response information to the telephony framework layer.

14. The non-transitory storage medium according to claim 13, wherein the method further comprises:
sending the at least one command in the command queue to the AT command channel of the electronic device when the buffer storage does not store the determined identifier;
storing the determined identifier and the determined command contents of each of the at least one command into the buffer storage, in response to receiving second response information from the AT command channel; and
sending the second response information to the telephony framework layer.

15. The non-transitory storage medium according to claim 13, wherein the method further comprises:
sending the received command sent by the telephony framework layer to the AT command channel when the electronic device is not establishing the communication link.

16. The non-transitory storage medium according to claim 13, wherein the method further comprises:
   clearing all data in the buffer storage when the command queue has no command.

17. The non-transitory storage medium according to claim 13, wherein the communication link follows a Packet Data Protocol (PDP).

18. The non-transitory storage medium according to claim 13, wherein the method further comprises:
   presetting one or more specified commands to establish the communication link of the electronic device;
   determining whether one of the one or more specified commands is received from the telephony framework layer; and
   determining that the electronic device is establishing the communication link, when one of the one or more specified commands is received from the telephony framework layer.

* * * * *